(12) United States Patent
Saban et al.

(10) Patent No.: US 11,005,312 B2
(45) Date of Patent: May 11, 2021

(54) SKEWED STATOR DESIGNS FOR HYBRID HOMOPOLAR ELECTRICAL MACHINES

(71) Applicant: UNISON INDUSTRIES, LLC, Jacksonville, FL (US)

(72) Inventors: Daniel Michael Saban, Norwich, NY (US); Charles Michael Stephens, Pattersonville, NY (US)

(73) Assignee: UNISON INDUSTRIES, LLC, Jacksonville, FL (US)

( * ) Notice: Subject to any disclaimer, the term of this patent is extended or adjusted under 35 U.S.C. 154(b) by 289 days.

(21) Appl. No.: 15/358,094

(22) Filed: Nov. 21, 2016

(65) Prior Publication Data

US 2018/0145572 A1  May 24, 2018

(51) Int. Cl.
*H02K 1/14* (2006.01)
*H02K 21/16* (2006.01)
*H02K 1/27* (2006.01)
*H02K 1/02* (2006.01)

(52) U.S. Cl.
CPC .......... *H02K 1/148* (2013.01); *H02K 21/16* (2013.01); *H02K 1/02* (2013.01); *H02K 1/2733* (2013.01)

(58) Field of Classification Search
CPC ...... H02K 1/148; H02K 21/16; H02K 1/2733; H02K 1/02; H02K 19/18; H02K 1/14; H02K 2201/06
USPC .............................. 310/178, 156.47, 112–114
See application file for complete search history.

(56) References Cited

U.S. PATENT DOCUMENTS

| 4,672,253 | A | * | 6/1987 | Tajima | H02K 21/16 310/156.01 |
| 4,995,658 | A | * | 2/1991 | Shiraki | E05B 47/0012 292/201 |
| 5,010,266 | A | * | 4/1991 | Uchida | H02K 1/2773 310/156.22 |
| 5,327,069 | A | * | 7/1994 | Radun | H02K 21/44 318/400.13 |
| 5,397,951 | A | * | 3/1995 | Uchida | H02K 1/278 310/156.21 |
| 6,097,124 | A | * | 8/2000 | Rao | H02K 21/046 310/156.48 |
| 6,252,323 | B1 | * | 6/2001 | Nishikawa | H02K 1/278 310/112 |
| 6,777,847 | B1 | | 8/2004 | Saban et al. | |
| 6,975,055 | B2 | * | 12/2005 | Joong | B61C 9/48 310/156.01 |
| 7,071,592 | B1 | * | 7/2006 | Lu | H02K 1/278 310/156.25 |

(Continued)

OTHER PUBLICATIONS

Received STIC search report from EIC 2800 searcher Mesfin Getaneh dated Jul. 17, 2018 for claim 1.*

(Continued)

*Primary Examiner* — Emily P Pham
*Assistant Examiner* — Htet Z Kyaw
(74) *Attorney, Agent, or Firm* — McGarry Bair PC (57) ABSTRACT

Provided is a method for implementing skewing in a hybrid homopolar generator. The method includes aligning slots within an axial front segment of a stator, with corresponding slots within an axial back segment of the stator. The method also includes moving, during assembly, the axial front segment and the axial back segment relative to each other such that slots in the axial front segment and the axial back segment form a pattern.

15 Claims, 10 Drawing Sheets

(56) References Cited

U.S. PATENT DOCUMENTS

| | | | | |
|---|---|---|---|---|
| 7,327,062 | B2* | 2/2008 | Kaneko | H02K 1/276 310/156.53 |
| 7,518,277 | B2* | 4/2009 | Nemoto | H02K 29/03 310/156.45 |
| 7,928,622 | B2* | 4/2011 | Okubo | H02K 29/03 310/156.47 |
| 8,247,940 | B2* | 8/2012 | Hino | H02K 1/276 310/156.47 |
| 10,141,821 | B2* | 11/2018 | Takemoto | H02K 1/2713 |
| 2003/0005579 | A1* | 1/2003 | Takahashi | H02K 15/0428 29/732 |
| 2003/0052564 | A1* | 3/2003 | Wilsdorf | H01R 39/24 310/179 |
| 2004/0021387 | A1* | 2/2004 | Whitesell | H02K 31/02 310/168 |
| 2004/0070298 | A1* | 4/2004 | Aiello | F16C 17/107 310/90 |
| 2005/0121990 | A1* | 6/2005 | Kaneko | H02K 1/276 310/156.47 |
| 2005/0242681 | A1* | 11/2005 | Ionel | H02K 1/2733 310/216.062 |
| 2006/0244335 | A1* | 11/2006 | Miyazaki | H02K 1/278 310/156.47 |
| 2007/0024147 | A1* | 2/2007 | Hirzel | H01F 1/14775 310/191 |
| 2007/0152528 | A1* | 7/2007 | Kang | H02K 21/225 310/156.55 |
| 2008/0024028 | A1* | 1/2008 | Islam | H02K 11/215 310/187 |
| 2008/0048513 | A1* | 2/2008 | Wilsdorf | H02K 31/00 310/74 |
| 2008/0136272 | A1* | 6/2008 | Ishikawa | H02K 1/243 310/58 |
| 2009/0058374 | A1* | 3/2009 | Evans | H02K 11/046 322/28 |
| 2009/0224627 | A1* | 9/2009 | Hino | B60L 15/20 310/216.077 |
| 2010/0225112 | A1* | 9/2010 | Hayakawa | H02K 3/28 290/43 |
| 2010/0277027 | A1* | 11/2010 | Kaiser | H02K 1/276 310/156.47 |
| 2011/0254474 | A1* | 10/2011 | Saito | H02P 27/06 318/139 |
| 2012/0169171 | A1 | 7/2012 | Jansen et al. | |
| 2013/0169097 | A1* | 7/2013 | Saban | H02K 29/03 310/156.08 |
| 2013/0200741 | A1* | 8/2013 | Raad | H02K 31/00 310/178 |
| 2014/0091673 | A1* | 4/2014 | Anbarasu | H02K 3/28 310/216.109 |
| 2014/0361646 | A1* | 12/2014 | Saito | H02K 3/28 310/51 |
| 2015/0084470 | A1* | 3/2015 | Takemoto | H02K 1/226 310/156.69 |
| 2015/0091410 | A1* | 4/2015 | Post | H02K 1/14 310/216.093 |
| 2016/0028277 | A1* | 1/2016 | Takemoto | H02K 3/18 310/156.69 |
| 2016/0056679 | A1* | 2/2016 | Sakaue | H02K 1/16 310/198 |
| 2018/0109153 | A1* | 4/2018 | Matsuoka | H02K 21/16 |
| 2019/0036389 | A1* | 1/2019 | Isogai | H02K 5/225 |
| 2019/0097510 | A1* | 3/2019 | Takemoto | H02K 1/2713 |

OTHER PUBLICATIONS

Received STIC search report from EIC 2800 searcher Mesfin Getaneh dated Jul. 19, 2018 for claim 8.*
Received STIC search report from EIC 2800 searcher Mesfin Getaneh dated Jul. 20, 2018 for claim 16.*

* cited by examiner

SKEWED STATOR DESIGNS FOR HYBRID HOMOPOLAR ELECTRICAL MACHINES

I. TECHNICAL FIELD

The present disclosure relates generally to electrical machines. In particular, the present disclosure relates to reducing flux harmonics between a rotor and a stator in a hybrid homopolar (HHP) electrical machine.

II. BACKGROUND

HHP electrical machines, are adaptable for use in avionics generally, and aircraft engines in particular. These generators, which represent an integration of traditional electrical power generation techniques, are typically lighter and more efficient than conventional generators, thus making them suitable for use in the avionics industry.

A HHP generator is an embellishment of a type of machine referred to in the art as a homopolar inductor alternator. In homopolar inductor alternators, a direct current (DC) excitation field coil and alternating current (AC) armature coils are situated in the stator. The armature coils must be linked with alternating flux, obtained by magnetic reluctance variations embodied in the rotor structure.

As a practical matter, a typical HHP stator assembly includes two (split) stator halves aligned axially, corresponding to respective axially aligned rotor sections. The unidirectional field coil is situated between the two stator halves. The reluctance variations embodied in the rotor act upon the unidirectional flux produced by the field coil to produce an alternating flux seen by the armature coils. As understood in the art, the term hybrid implies inclusion of magnets in the rotor. The nature of the magnet approach will also produce an alternating flux seen by the armature coils.

A major challenge of conventional HHP generators is stator tooth flux ripple: an effect causing armature voltage variations that interact with the armature load, the armature winding, and with the rotor. One consequence of this interaction is a creation of flux harmonic losses on the rotor, in particular on the rotor sleeve. These harmonic losses can impose a pulsating force on the rotor, causing the rotor to overheat. These losses are described in greater detail below in terms of ideal voltage and torque waveforms.

Rotor loss reduction, in pursuit of an ideal voltage waveform, and slot-order space harmonic reduction, to achieve an ideal torque waveform, are major technical challenges associated with the design and manufacture of HHP electric machines. The effects of rotor losses and slot-order space harmonics can significantly complicate the HHP electric machine design, resulting in more expensive and more complicated stator stacks, or the need of additional filter elements.

For example, the split stator design of the HHP electric machine, noted above, typically has the two stator halves aligned axially. Rotationally offsetting the two stator halves by one half of a stator slot pitch will decouple the stator slot-order harmonic flux. This approach, however, will still impart a dynamic axial load at the slot-order frequency, in addition to compounding the difficulty of the insertion of the armature winding.

III. SUMMARY

Embodiments of the present disclosure provide methods and systems for reducing, or eliminating, coupling of flux harmonics between the rotor and stator of a HHP. In particular, various embodiments provide a helical skew, for example, of one full stator slot pitch in opposite directions in each of the stator or rotor sections, respectively. Such an exemplary technique can eliminate axial force components, reducing the expense and complication of stator stack designs.

In one exemplary embodiment, a method is provided for implementing skewing in a hybrid homopolar generator. The method includes aligning slots within an axial front segment of a stator, with corresponding slots within an axial back segment of the stator. The method also includes moving, during assembly, the axial front segment and the axial back segment relative to each other such that slots in the axial front segment and the axial back segment form a pattern.

The illustrious embodiments provide significant technical advantages over conventional approaches. For example, in the embodiments a major component of rotor losses is significantly reduced. The opposite skew directions between the stator opposite a north rotor section and the stator opposite a south rotor section nearly completely decouple the harmonics noted above. Stators designed in accordance with this approach can enable achieving output voltage requirements and other typical specification limits for resulting AC waveform quality. This AC waveform quality can be achieved without adding additional filter elements. The axially split stator construction of the HHP provides a solution to rotor-stator flux decoupling not normally easily attainable.

Additional features, modes of operations, advantages, and other aspects of various embodiments are described below with reference to the accompanying drawings. It is noted that the present disclosure is not limited to the specific embodiments described herein. These embodiments are presented for illustrative purposes only. Additional embodiments, or modifications of the embodiments disclosed, will be readily apparent to persons skilled in the relevant art(s) based on the teachings provided.

IV. BRIEF DESCRIPTION OF THE DRAWINGS

Illustrative embodiments may take form in various components and arrangements of components. Illustrative embodiments are shown in the accompanying drawings, throughout which like reference numerals may indicate corresponding or similar parts in the various drawings. The drawings are only for purposes of illustrating the embodiments and are not to be construed as limiting the disclosure. Given the following enabling description of the drawings, the novel aspects of the present disclosure should become evident to a person of ordinary skill in the relevant art(s).

V. DETAILED DESCRIPTION

While the illustrative embodiments are described herein for particular applications, it should be understood that the present disclosure is not limited thereto. Those skilled in the art and with access to the teachings provided herein will recognize additional applications, modifications, and embodiments within the scope thereof and additional fields in which the present disclosure would be of significant utility.

Figure 1:
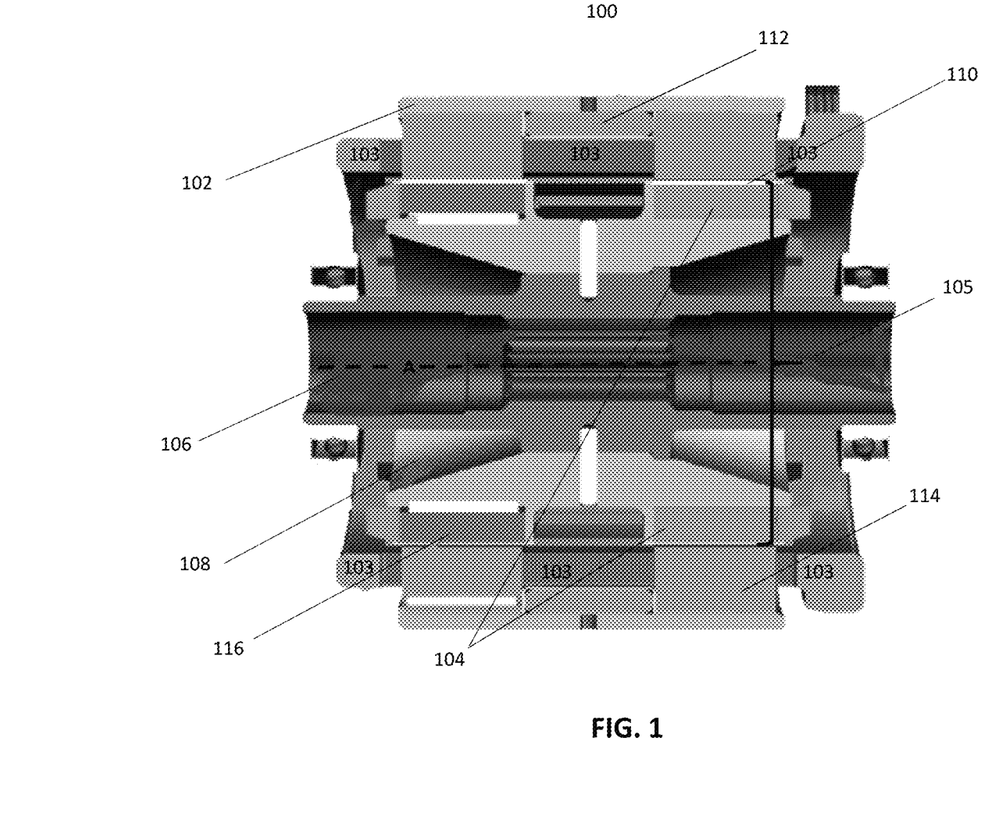
FIG. 1 illustrates a hybrid homopolar (HHP) electric generator constructed in accordance with various aspects described herein.

FIG. 1 illustrates an exemplary hybrid homopolar (HHP) electric generator 100 constructed in accordance with various aspects described herein. The generator 100 includes a stator yoke 102 for holding armature coils 103 (see FIG. 2).

Figure 2:
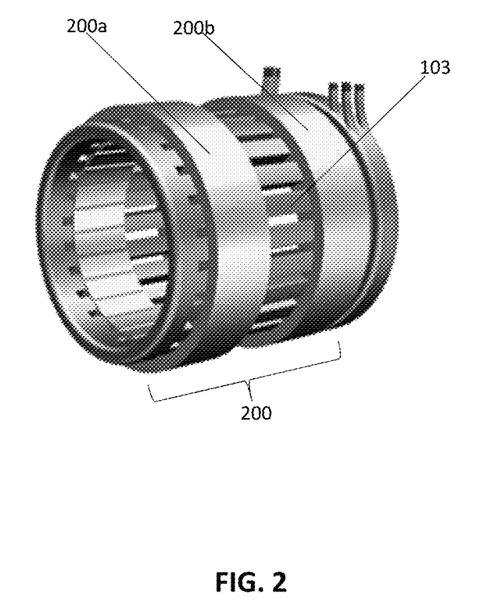
FIG. 2 illustrates a stator assembly used in the HHP electric generator depicted in FIG. 1.

FIG. 2 illustrates a partial stator assembly (i.e. stator) 200, including substantially identical stator stacks 202a and 202b having the armature coils 103 inserted into the stator 200.

Returning to FIG. 1, the generator 100 also includes magnets 104, and a rotor 105 formed of several integrated components, discussed more fully below. For exemplary magnets 104 can be formed of samarium cobalt. Additionally or alternatively, however, the magnets can be constructed of other suitable materials.

The rotor 105 includes a rotor shaft 106, representing an axis (A) around which major components of the rotor 105 rotate. A rotor hub 108 is positioned against the rotor shaft 106. A rotor sleeve 110 is provided as a centrifugal restraint, positioning the magnets 104 in place. A field coil 112, for producing an electromagnetic field, is provided affixed to the stator 200. The field coil 112 is circumferentially wound into a space in between stator stacks 200a and 200b. By way of background, the field coils being affixed to the rotors, in conventional synchronous electric machines, contribute to difficulty in balancing the rotors. Along with creation of heat by the field coils, having the field coils attached to the rotor makes conventional synchronous electric machines generally more challenging to design and construct.

The HHP electric generator 100 also includes a stator core 114. The stator core 114 conducts flux, produced by the armature winding 103 and the field coil 112, around the rotor 105 and the stator 200. Inductor poles 116 further enhance the conduction of the flux produced by the field coil 112, around the armature winding 103, the stator core 114, stator yoke 102, and the rotor hub 108. As the rotor 105 rotates, the peripherally segmented nature of the inductor poles 116 imparts essential alternating flux variation to the armature winding 103 from the unidirectional nature of flux produced from the field coil 112. The exemplary inductor poles 116, depicted in FIG. 1, can be constructed of laminated silicon steel.

Figure 3:
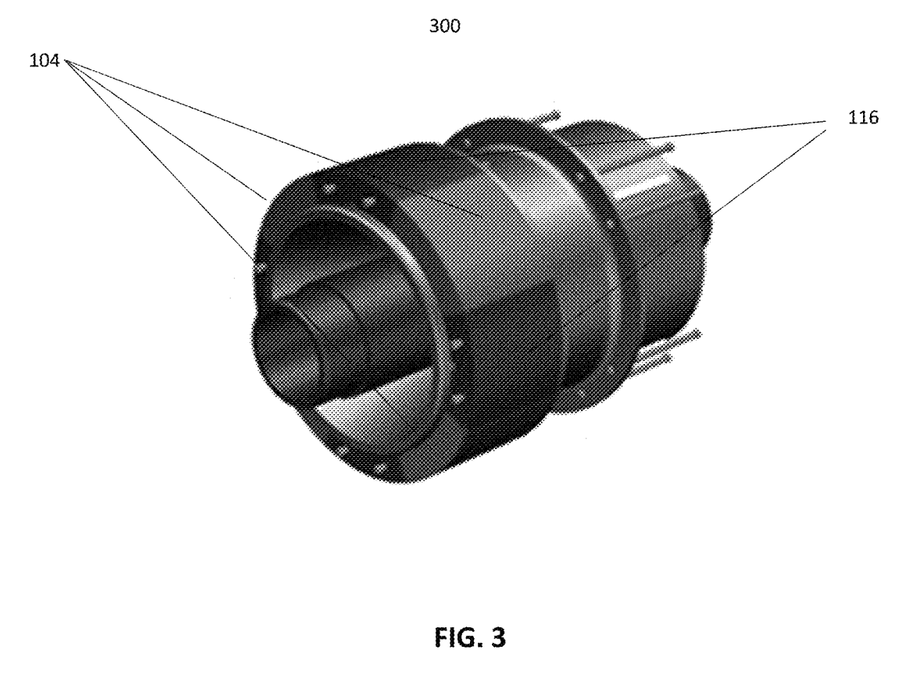
FIG. 3 illustrates more detailed aspects of an exemplary rotor assembly depicted in FIG. 1.

FIG. 3 provides a more detailed illustration of the rotor 105, including the inductor poles 116. Additionally, as the rotor 105 rotates, the peripherally segmented nature of the magnets 104 imparts essential alternating flux variation to the armature winding 103. The alternating flux produced from the field coil 112 and inductor poles 116 can add or subtract to the alternating flux produced from the magnets 104. This adding or subtracting occurs according to the direction and magnitude of the direct current (DC) current supplied to the field coil 112.

Figure 4:
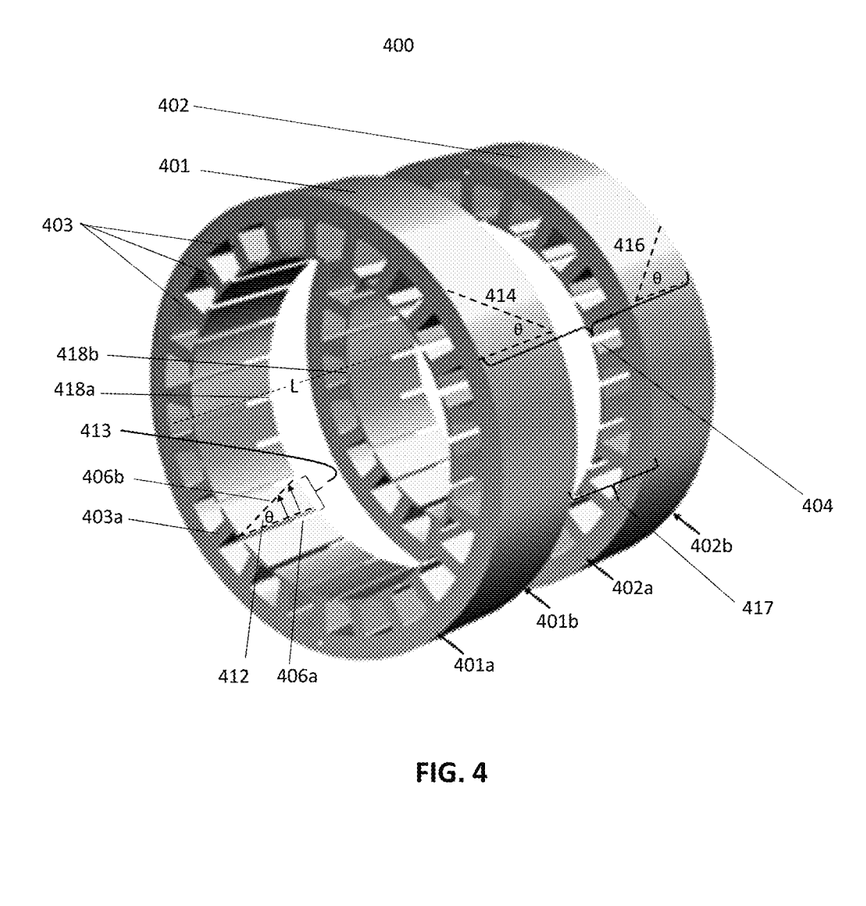
FIG. 4 illustrates an exemplary stator assembly of an HHP electric generator, implementing skewing in accordance with various aspects described herein.

FIG. 4 illustrates an exemplary stator assembly 400 for an HHP electric generator, implementing skewing in accordance with various aspects described herein. The stator assembly 400 includes an axial front stator 401, an axial back stator 402, and stator teeth 403. More specifically, FIG. 4 is an illustration of skewing implemented in the stator 400 in accordance with the various aspects. The under-laying computer-aided design (CAD) illustration of FIG. 4 is that of un-skewed stators. The superimposed dotted lines illustrate how all edges are to be transformed into the skewing embodiment, described herein.

Figure 5:
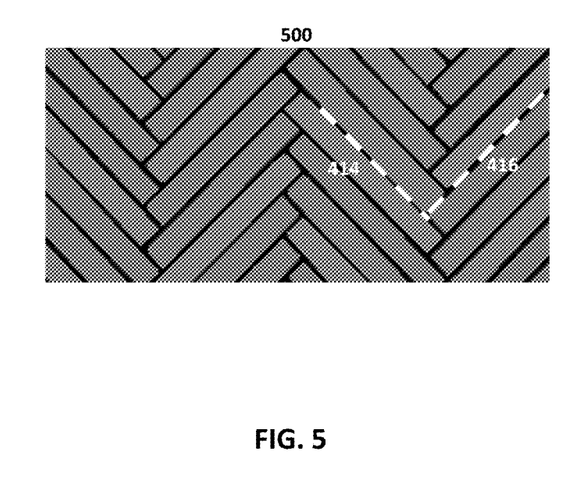
FIG. 5 illustrates an exemplary herringbone pattern implemented in various aspects described herein.

The axial front stator 401 includes a front edge 401a and a back edge 401b. Similarly, the axial back stator 402 includes a front edge 402a and a back edge 402b. Skewing functionality is implemented by transforming the respective front and back stators 401 and 402 to form a skew pattern 404 (see FIG. 5), generally resembling a herringbone. FIG. 5 illustrates a generic herringbone pattern 500.

By way of background, and as understood by those of skill in the art, the rotor 105 rotates inside of the stator 200. The rotor 105 is rotated by a mechanical power source, such as from gearing from an aircraft engine. Electric currents in the armature winding 103 react with the magnetic fields produced by the rotor 105 (inductor poles 116 interacting with the field coil 112, and the magnets 104), to provide electrical power to an electrical load. In a conventional HHP electric generator, the magnetic field produced by the armature winding 103 rotates in a manner to maintain alignment with the magnetic field produced by the rotor 105.

As a consequence torque ripple, discussed more fully below, the rotor 105 actually turns in a non-uniform motion, having superimposed small steps or jerks. By building the rotor 105, or the stator 200, with a twist (i.e., skewing the design), the magnets 104 and inductor poles 116 (or edges of teeth in the stator 200) are twisted around the rotor shaft 106. This skewing causes a reciprocal effect of the magnetic field, cancelling the torque ripple, ultimately resulting in smoother rotation of the rotor 105 and more efficient operation of the HHP electric generator 100. FIG. 4 illustrates this skewing process in a stator assembly 400, in accordance with an embodiment.

In FIG. 4, an un-skewed trajectory edge 406a (dotted line) is shown with reference to a stator tooth 403a (of teeth 403) of the stator 400. By way of example, the edge 406a can be peripherally shifted during assembly, such as during the lamination stacking process. During this skewing, or shifting process, the edge 406a travels to form a shifted edge 406b at a skew angle (θ) 412. Arrows indicate movement of the un-skewed edge 406a forming the skewed edge 406b.

Skewing is implemented across all of the stator teeth 403 for respective front and back stators 401 and 402, to form a herringbone pattern at bracket 404. See FIG. 5, depicting a more detailed illustration of a herringbone pattern 500. In FIG. 4, the bracket 404 depicts example skews 414 and 416 associated with outer surfaces of the stator stacks 401 and 402. The amount (degree) of skewing is a function of a the number of teeth 403 of the stators 401 and 402 in the stator assembly 400.

FIG. 5, for purposes of illustration, depict skews 414 and 416 superimposed over the generic herringbone pattern 500. Following a pattern resembling the herringbone pattern 500 enables the armature winding 103 to be more easily assembled while implementing the skew functionality.

Returning to FIG. 4, the skew of the axial front stator 401 is shifted clockwise to form the exemplary skew 414. The skew of the axial back stator 402 is shifted counterclockwise to form the exemplary skew 416. In practice, to implement skewing, the front stator 401 is twisted in a substantially clockwise direction and the back stator 402 is twisted in a substantially counterclockwise direction.

The twisting occurs as a function of the slot-pitch dimension 413 of the stator teeth 403 such that the axial front stator 401, the twisting travels clockwise one slot-pitch dimension going from front edge 401a to a back edge 401b. Likewise, in the axial back stator 402, the twisting travels counterclockwise one slot-pitch dimension going from a front edge 402a to a back edge 402b. For facilitating insertion of the armature winding 103, edges of the teeth 403 located at the back edge 401b should peripherally align with edges located at the front edge 402a, of corresponding teeth, across an inter-stack space 417.

As the assembly continues, the armature winding 103 is inserted beginning at the back edge 401b of the axial front stator 401 (clockwise) to the front edge 402a of the axial back stator 402 (counterclockwise). During this process, slot openings, such as slot openings 418a and 418b at respective edge 401b and 402a, are desirably aligned as depicted along alignment line (L) of FIG. 4.

Figure 6:
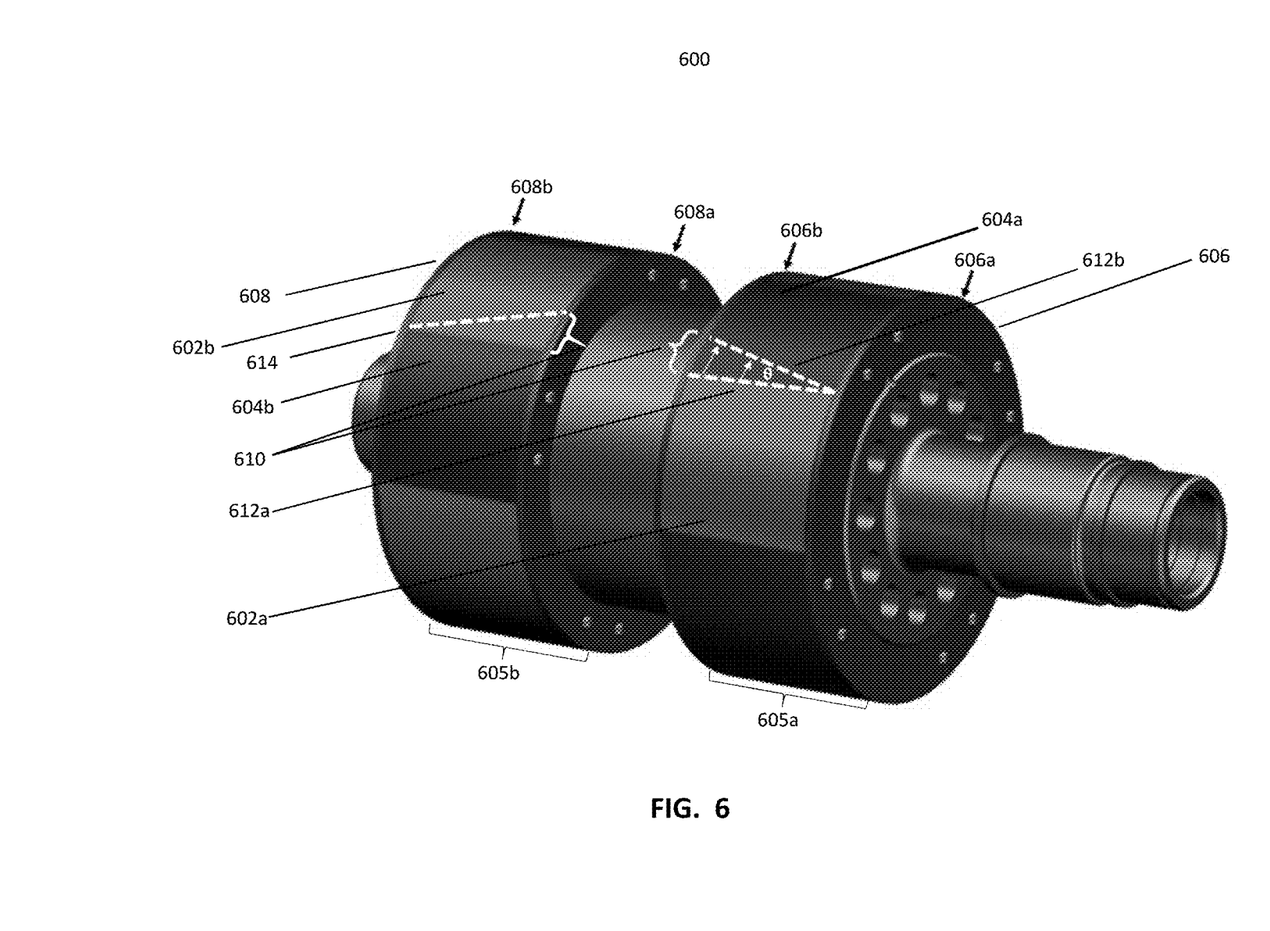
FIG. 6 illustrates an exemplary rotor assembly of an HHP electric generator, implementing skewing in accordance with various aspects described herein.

FIG. 6. illustrates an exemplary rotor assembly 600 for an HHP electric generator implementing skewing in accordance with various aspects described herein. In the embodiments, skewing can be implemented in HHP electric generators in a stator assembly, or in a rotor assembly.

The rotor 600 includes magnets 602a/602b alternating with inductor poles 604a/604b. The rotor 600 also includes an axial front rotor 606 and an axial back rotor 608. Similar to the construction of the stator 400, the axial front rotor 606 includes a front edge 606a and a back edge 606b. The axial back rotor 608 includes a front edge 608a and a back edge 608b.

The exemplary rotor 600 skews rotor magnets, such as the magnet 602a, one slot pitch 610 over an axial length 605a of the front rotor 606. Correspondingly, the magnet 602b is skewed one slot pitch 610 over an axial length 605b of the axial back rotor 608. Arrows indicate movement of an un-skewed edge 612a, forming a skewed edge 612b in the magnet 602a of the axial front rotor 606. Similarly, a skewed edge 614 is depicted the magnet 602b of the axial back rotor 608. The skewing of magnets in the axial front rotor 606 relative to the axial back rotor 608 occurs in a pattern, similar to skewing in the stator assembly 400, discussed above. This pattern can also resemble the herringbone pattern 500 of FIG. 5.

In the rotor 600, skewing is implemented with a clockwise twist travelling the one slot pitch 610 from front edge 606a to back edge 606b of the axial front rotor 606. In the axial back rotor 608, skewing is implemented with a counterclockwise twist travelling one slot-pitch 610 from front edge 608a to back edge 608b.

Skewing, as described herein, can be implemented in concert with optimization of magnet pole arcs (not shown) and stator slot opening size. Skewing can also be implemented with holes for flux shaping in laminations at the edges 606a/b and 608a/b of respective magnets 602a and 602b, and in shaping of magnet faces and/or bridges, in embodiments utilizing embedded magnet designs. In an alternative embodiment, each axial front rotor and axial back rotor can be fabricated in two identical sections then assembled such that the sections are rotated by one-half slot pitch. When the axial front rotor and axial back rotor are aligned, the two most innermost sections desirably have the same rotation direction.

Figure 7A:
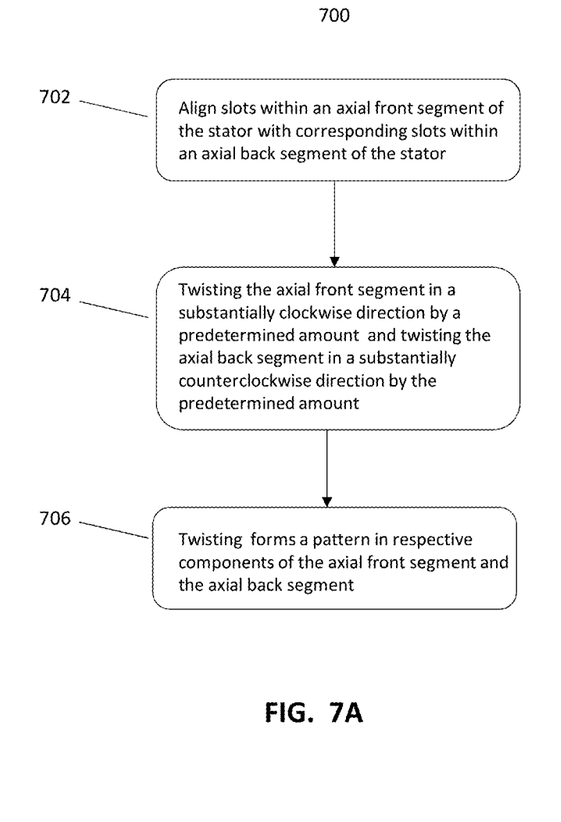
FIG. 7A is an exemplary method of implementing skewing in a stator in accordance with the various aspects.

FIG. 7A is an exemplary method 700 of practicing an embodiment of the present disclosure for implementing skewing in a hybrid homopolar electric machine, the machine including a stator. The method 700 includes aligning slots within an axial front segment of the stator with corresponding slots within an axial back segment of the stator in block 702. The method also includes twisting the axial front segment in a substantially clockwise direction by a predetermined amount and twisting the axial back segment in a substantially counterclockwise direction by the predetermined amount, as depicted in block 704. The twisting forms a pattern in respective components of the axial front segment and the axial back segment, as depicted in block 706.

Figure 7B:
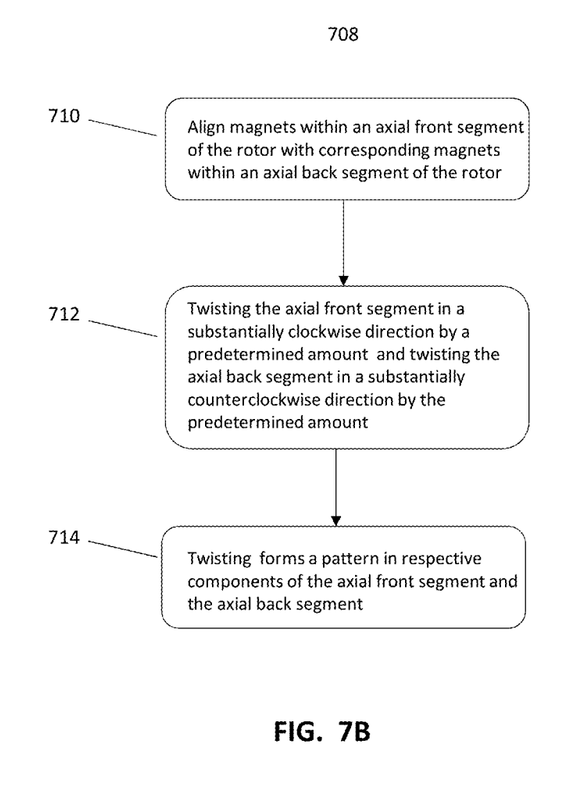
FIG. 7B is an exemplary method of implementing skewing in a rotor in accordance with the various aspects.

FIG. 7B is an exemplary method 708 of practicing an embodiment of the present disclosure for implementing skewing in a hybrid homopolar electric machine, the machine including a rotor. The method 708 includes aligning magnets within an axial front segment of the rotor with corresponding magnets within an axial back segment of the rotor in block 710. The method also includes twisting the axial front segment in a substantially clockwise direction by a predetermined amount and twisting the axial back segment in a substantially counterclockwise direction by the predetermined amount, as depicted in block 712. The twisting forms a pattern in respective components of the axial front segment and the axial back segment, as depicted in block 714.

Figure 8A:
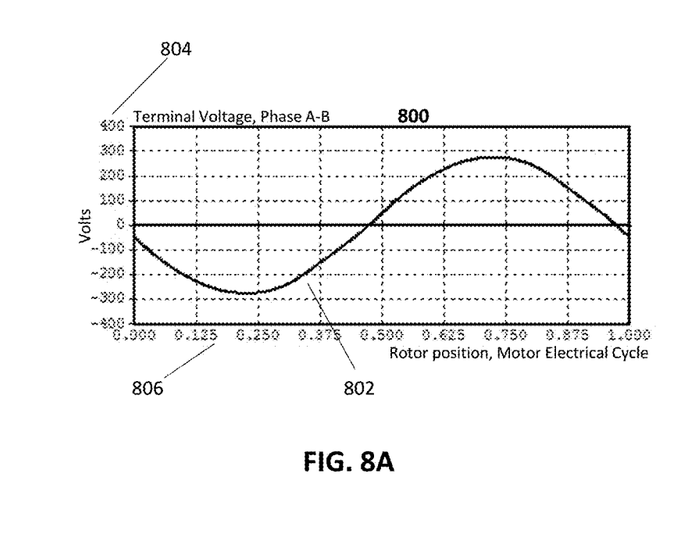
FIG. 8A is an example illustration of a graph of a desirable armature voltage waveform produced by a rotor rotation in an HHP electric machine, in accordance with various aspects described herein.

FIGS. 8A, 8B, 9A, and 9B graphically depict performance improvements provided by the various aspects described herein. For example, FIG. 8A illustrates a graph 800 of a desirable, perfectly sinusoidal, voltage waveform 802 produced as a rotor in an HHP electric generator rotates. The waveform 802 is graphed along voltage axes 804 and rotation position axes (i.e., motor electrical cycle) 806. The perfectly sinusoidal voltage waveform 802 is not achievable using conventional HHP electric generators.

Figure 8B:
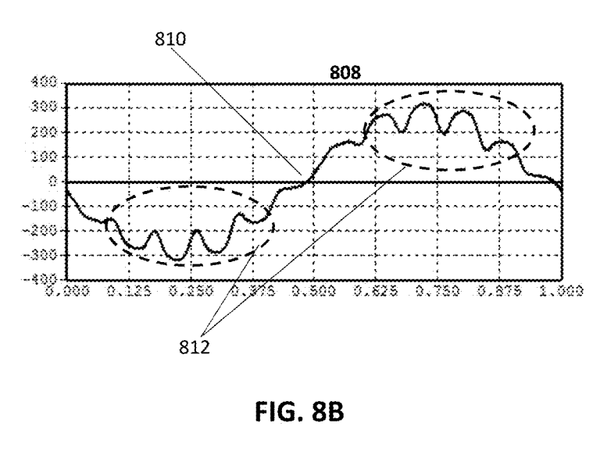
FIG. 8B is an example illustration of a graph of an actual armature voltage waveform produced by rotor rotation in typical HHP electric machines.

FIG. 8B illustrates a graph 808 of an actual voltage waveform 810 produced as a rotor in a conventional HHP electric generator rotates. The waveform 810 includes harmonic ripples 812 (voltage variations) that can cause losses and heating in the load, armature winding, and rotor, as the rotor rotates. The higher the order and magnitude of the harmonic ripples 812, the greater the losses in the load and armature winding, and the heating in the rotor. These effects can significantly reduce generator performance. Torque waveforms in conventional HHP electric generators include similar effects.

Figure 9A:
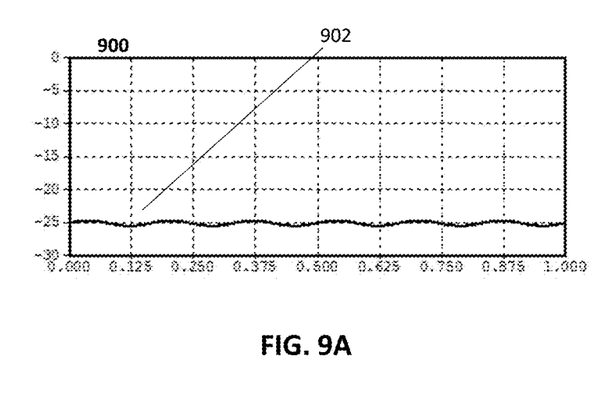
FIG. 9A is an example illustration of a graph depicting an ideal torque waveform produced by rotor and stator interaction during operation of an HHP electric machine, constructed in accordance with the various aspects described herein.

FIG. 9A is a graph 900 of a relatively flat, ideal torque waveform 902 produced during operation of an HHP electric generator.

Figure 9B:
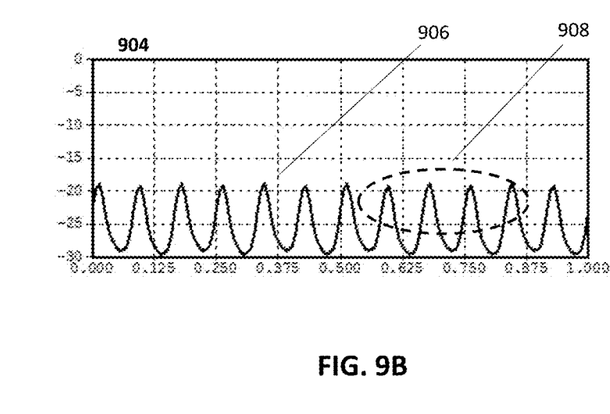
FIG. 9B is an example illustration of a graph depicting harmonic distortions in a torque waveform produced by rotor and stator interaction during operation of typical HHP electric machines.

In contrast, FIG. 9B illustrates a graph 904 depicting harmonic distortions similar to the graph 808 in FIG. 8B. The graph 904 depicts a torque waveform 906 produced in a conventional HHP electric generator. The torque waveform 906 includes an imposition of high order harmonics 908, which can create excessive vibration and noise. These effects also represent considerations in generator bearing design. The harmonics 908, also known as slot-order space harmonics, are caused by the magnetic reluctance variations between slot openings in a stator of a conventional HHP electric generator. The harmonics 908 are often reinforced by a pulse-count of time-harmonic passive rectification switching and are a main contributor to the losses.

By implementing skewing either on the stator 400 or on the rotor 600, the various aspects described herein, reduce or eliminate the harmonic ripples 812 in the armature voltage waveform 810, depicted in FIG. 8B. That is, an armature voltage waveform produced by the stator 400 or the rotor 600 will more closely resemble the pure sinusoidal waveform 802. Similarly, various aspects described herein reduce or eliminate the slot-order space harmonics 908 in the torque waveform 906 depicted in FIG. 9B. By contrast, a torque waveform produced by the stator 400 or the rotor 600 will more closely resemble the substantially flat torque waveform 902 of FIG. 9A.

Alternative embodiments, examples, and modifications which would still be encompassed by the disclosure may be made by those skilled in the art, particularly in light of the foregoing teachings. Further, it should be understood that the terminology used to describe the disclosure in intended to be in the nature of words of description rather than of limitation.

Those skilled in the relevant art(s) will appreciate that various adaptations and modifications of various aspects described herein described above can be configured without departing from the scope and spirit of the disclosure. Therefore, it is to be understood that, within the scope of the appended claims, the disclosure may be practiced other than as specifically described herein.

What is claimed is:

1. A method for implementing skewing in a hybrid homopolar generator, the method comprising:
   aligning slots within an axial front stator, with corresponding slots within an axial back stator;
   skewing a plurality of teeth in the axial front stator and a plurality of teeth in the axial back stator, each tooth of the plurality of teeth having a slot-pitch dimension;
   wherein the skewing includes:
   rotating an edge of a tooth disposed within the axial front stator, the rotating (i) being according to a predetermined skew angle in a first angular direction relative to a horizontal direction; and (ii) causing the axial front stator to twist clockwise one tooth slot pitch dimension from a front edge of the front stator to a back edge of the front stator;
   rotating another edge of another tooth disposed within the axial back stator, the rotating (i) being according to the predetermined skew angle relative to the horizontal direction but in a second angular direction opposite to the first angular direction; and (ii) causing the axial back stator to twist counter-clockwise one tooth slot pitch dimension from a front edge of the back stator to a back edge of the back stator; and
   positioning, during assembly, the axial front stator and the axial back stator relative to each other such that the slots in the axial front stator and the slots in the axial back stator form a herringbone pattern as result of the skewing.

2. The method of claim 1, wherein slots within the axial front stator and the axial back stator are equal in number.

3. The method of claim 1, wherein the predetermined skew angle is less than 90 degrees.

4. The method of claim 1, wherein positioning the axial front stator and the axial back stator includes aligning a set of teeth within the axial front stator with a set of teeth within the axial back stator.

5. The method of claim 4, wherein positioning the axial front stator and the axial back stator includes twisting the axial front stator relative to the axial back stator by at least one stator slot pitch.

6. A method for implementing skewing in a hybrid homopolar electric machine, the method comprising:
   providing LU at least one stator having a plurality of teeth disposed within the stator, each tooth of the plurality of teeth having a slot-pitch dimension and (ii) an armature winding for insertion within the at least one stator;
   aligning slots within an axial front stator with corresponding slots within an axial back stator, the axial front and back stators being included in the at least one stator; and
   twisting the axial front stator in a first direction one tooth slot dimension from a front edge of the front stator to a back edge of the front stator by a predetermined amount and twisting the axial back stator in a second direction one tooth slot dimension from a front edge of the back stator to a back edge of the back stator by the predetermined amount;
   wherein the twisting occurs as a function of (i) rotating an edge of a tooth of the plurality of teeth of the axial front stator, the rotating being according to a predetermined skew angle in a first angular direction relative to a horizontal direction; and (ii) rotating another edge of another tooth of the plurality of teeth of the axial back stator, the rotating being according to the predetermined skew angle relative to the horizontal direction but in a second angular direction opposite to the first angular direction; and
   wherein the twisting forms a pattern respective to edges of the teeth in the axial front stator in relation to edges of the teeth in the axial back stator.

7. The method of claim 6, wherein the predetermined amount is a function of at least one from a group including a slot width and a relative axial position of the axial front stator and the axial back stator.

8. The method of claim 6, wherein the first direction is clockwise and the second direction is counterclockwise.

9. The method of claim 6, wherein the predetermined amount is at least one stator slot pitch.

10. The method of claim 6, wherein the pattern forms a herringbone pattern shape.

11. The method of claim 6, wherein the aligning occurs during assembly of the at least one stator.

12. An electric machine comprising:
    an axial front stator;
    an axial back stator positioned in a predetermined manner relative to the axial front stator;
    a set of teeth of the axial front stator being positioned relative to a set of teeth of the axial back stator, each tooth of the sets of teeth having a slot-pitch dimension; and
    wherein an edge of a tooth of the set of teeth within the axial front stator and a corresponding edge of a tooth of the set of teeth within the axial back stator are each offset by a predetermined skew angle from a common horizontal line but in opposite directions, the offset causing (i) the axial front stator to twist in a clockwise direction one tooth slot-pitch dimension from a front edge of the front stator to a back edge of the front stator; and (ii) the axial back stator to twist in a counterclockwise direction one tooth slot-pitch dimension from a front edge of the back stator to a back edge of the back stator.

13. The electric machine of claim 12, wherein the electric machine is a hybrid homopolar generator.

14. The electric machine of claim 13, wherein the set of teeth of the axial front stator and the axial back stator form a herringbone pattern.

15. The electric machine of claim 12, wherein the set of teeth of the axial front stator are positioned with respect to the set of teeth of the axial back stator by an amount of at least one stator slot pitch.

* * * * *